Sept. 16, 1941.   L. C. ATWOOD   2,256,009
ADJUSTABLE VEHICLE SEAT
Filed Jan. 22, 1940   2 Sheets-Sheet 1
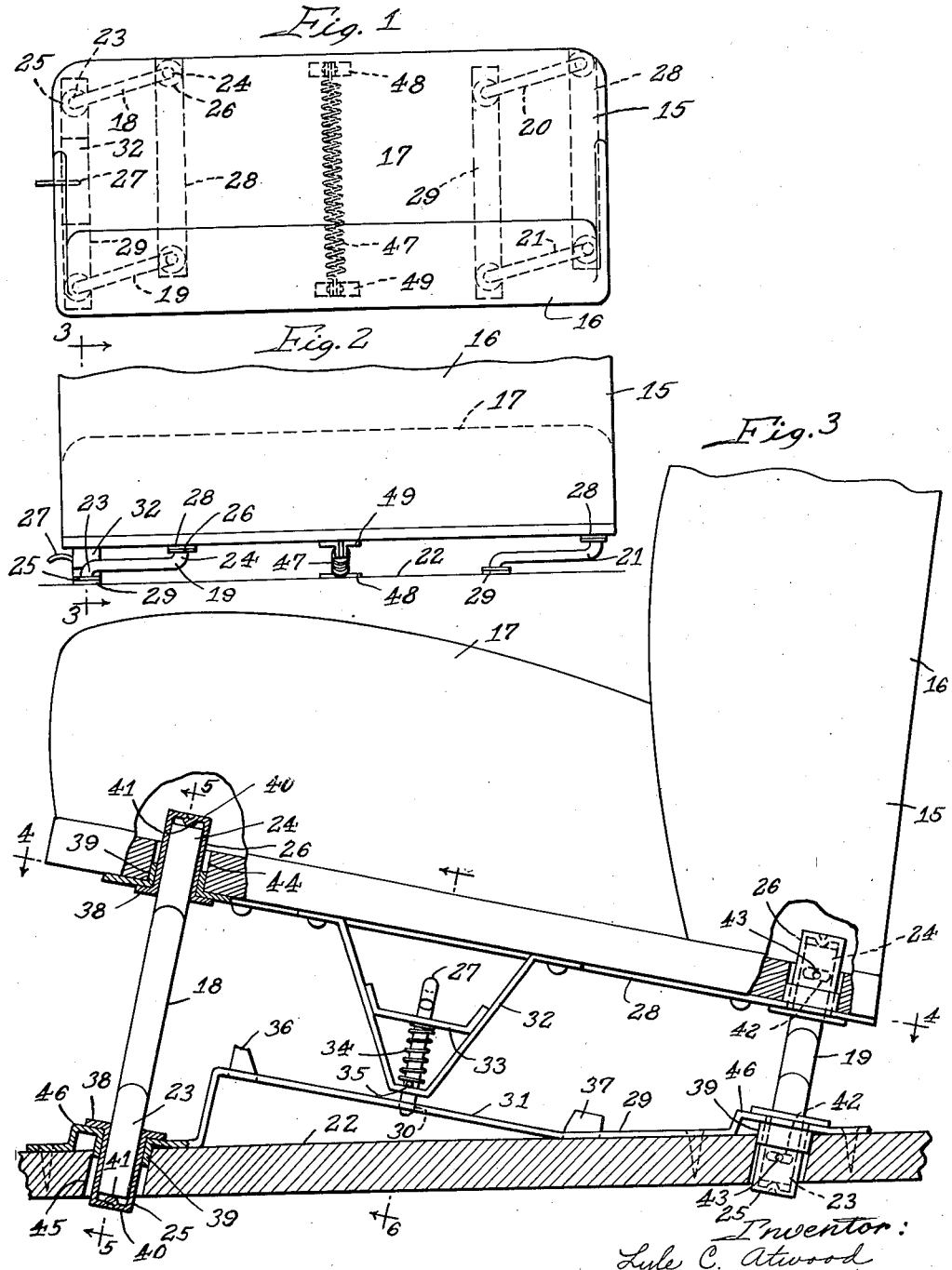
Inventor:
Lyle C. Atwood
By
McCanna, Wintercorn & Morebach
Attys.

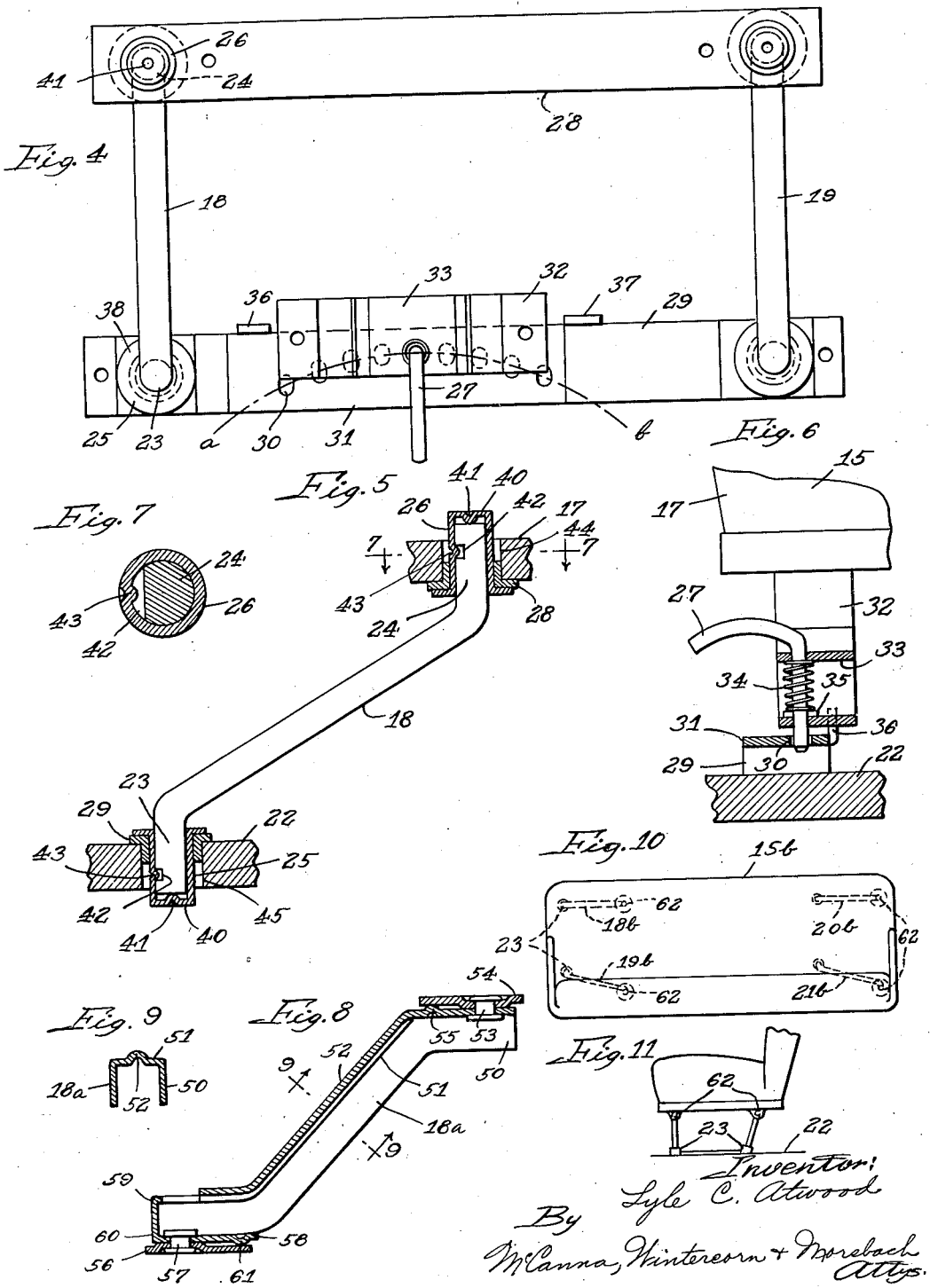

Patented Sept. 16, 1941

2,256,009

UNITED STATES PATENT OFFICE 2,256,009

ADJUSTABLE VEHICLE SEAT

Lyle C. Atwood, Rockford, Ill., assignor to The Atwood Vacuum Machine Company, Rockford, Ill., a copartnership composed of Seth B. Atwood and James T. Atwood Application January 22, 1940, Serial No. 314,936

18 Claims. (Cl. 155—14)

This invention relates to a new and improved adjustable vehicle seat.

Parallel seat slides have been used extensively for the adjustable mounting of vehicle seats, and have been objectionable because of high cost and their tendency to bind and work hard. It is therefore the principal object of my invention to provide a seat adjustable back and forth on pivoted crank members whereby to make for easier operation as well as simpler and more economical constructions and ones which do not call for as close accuracy in their installation.

Another object is to provide crank members in pairs at the opposite ends of the seat in fore and aft spaced relation and arranged so that the seat is given parallel adjustment, the crank members all having the same throw and long enough so that the sidewise movement of the seat incident to the fore and aft adjustment is not objectionable but is well within the limits of the allowable spacing of the ends of the seat relative to the side walls.

Still another object is to provide smaller height crank members for use under the rear portion of the seat, all of the crank members being inclined rearwardly from a vertical so that the seat moves in a plane inclined to the horizontal, the seat having counterbalancing spring means to avoid the tendency toward too free and easy movement rearwardly when released.

A further object is to provide crank members under the rear portion of the seat inclined rearwardly in relation to the plane of the front crank members and pivotally mounted with respect to the floor of the vehicle but having ball and socket connections with the seat bottom, whereby the seat in its forward adjustment maintains substantially the same elevation at the front edge of the seat bottom but the rear edge is raised appreciably, and conversely in rearward adjustment.

The inventioin is illustrated in the accompanying drawings, in which—

Fig. 1 is a plan view of a vehicle seat equipped with crank type adjustable supporting means in accordance with my invention;

Fig. 2 is a rear view of the seat with the upper portion thereof broken away;

Fig. 3 is an end view of the seat taken in the plane of the line 3—3 of Fig. 2 and with certain portions broken away and shown in section to better illustrate the construction;

Fig. 4 is a plan view of one interconnected pair of crank members, the view being taken on the line 4—4 of Fig. 3;

Figs. 5 and 6 are sectional details on the correspondingly numbered lines of Fig. 3;

Fig. 7 is a sectional detail on the line 7—7 of Fig. 5;

Fig. 8 is a view similar to Fig. 5, showing a modified or alternative crank construction;

Fig. 9 is a sectional detail on the line 9—9 of Fig. 8, and

Figs. 10 and 11 are a plan view and end view, respectively, of a vehicle seat equipped with a modified or alternative form of crank type adjustable supporting means.

Similar reference numerals are applied to corresponding parts throughout the views.

Referring first to Figs. 1 and 2, the reference numeral 15 designates a vehicle seat intended for use in an automobile, for example, as the driver's seat which requires fore and aft adjustment. The seat has a back 16 extending upwardly from the bottom 17, and the bottom 17 in accordance with my invention has four crank members 18—21 under the four corners thereof for adjustably mounting the same on the floor 22 to permit fore and aft adjustment of the seat. Each of the crank members 18—21 has upright pivot pin ends 23 and 24 in spaced relation longitudinally with respect to the seat, the pin 23 being received in a bearing 25 provided therefor in or on the floor 22, and the pin 24 being received in a bearing 26 therefor in or on the bottom of the seat. The crank members are all parallel to one another and have the same throw so that the seat has parallel adjustment and will accordingly remain in approximately right-angle relation to the longitudinal center line of the car. The throw of the crank members is long enough and the seat is adjusted through such a long angularity from one extreme position to the other that the amount of sidewise movement incident to the adjustment because of the arcuate paths described by the pivots 24 is not enough to be considered objectionable, the sidewise deviation from a given position when the seat is adjusted forwardly or rearwardly being well within the allowable spacing of the ends of the seat with respect to the side walls of the body. Any suitable or preferred latching means may be used for locking the seat in adjusted position, as, for example, that indicated at 27. A seat pivotally supported in this way can be adjusted much more easily than one having substantially parallel supporting slides, because the operator in adjusting the seat works on a long moment arm measured from any one of the pivots, and it requires very little force to overcome the slight resistance to turning movement as compared to the force required to overcome resistance to the sliding movement of the conventional seat slides. With the present construction, the operator is furthermore applying the force approximately at right angles to the crank members, thus gaining the best mechanical advantage, whereas, in the case of parallel seat slides, the driver in attempting to adjust the seat from one end works at a considerable disadvantage and tends to set up a binding action even in slides which would otherwise operate freely, and it goes without saying that most people, not being familiar with the problem, are not apt to move over to the middle of the seat in applying force in one direction or the other to adjust the seat. With the present construction, the tendency toward binding is eliminated and there is no difficulty in adjusting the seat from one end. Furthermore, with the substantially parallel seat slides, care had to be exercised in their installation to make sure that they were nearly parallel, because slight deviation from parallelism caused binding regardless of how the operator applied force to the seat in adjusting the same. With the present construction, that difficulty is eliminated particularly when the related crank members of a pair are coupled together in unitary assemblies. Then too, the present crank construction is much simpler and more economical to manufacture.

Referring now more particularly to Figs. 3 to 7, it will be seen that the crank members 18 and 19 are interconnected by sheet metal straps 28 and 29 adapted to be secured to the bottom of the seat and to the floor, respectively, the same being of course true of the other pair of crank members 20 and 21, except that the strap 29 for the crank members 18 and 19 has a series of holes 30 in a keeper plate portion 31 intermediate the ends to cooperate with the latch member 27, whereas the corresponding plate 29 for the crank members 20 and 21 omits this special formation, there being a latch member 27 only at the driver's end of the seat. The keeper plate 31 is inclined at an acute angle to the horizontal plane of the floor 22 substantially parallel to the bottom of the seat so as to maintain the same relationship to the latch member 27 in the bracket 32 mounted on the seat, in all positions of adjustment of the seat. The holes 30 are arranged in spaced relation in an arc a—b struck on a radius of the same length as any one of the crank members 18—21, the arc a—b indicating the path of movement of the seat in the fore and aft adjustment. The latch member 27 is indicated in Fig. 4 as engaged in the middle hole of the series of nine holes shown. 32 is a V-shaped sheet metal bracket fastened to the bottom of the seat having a cross-member 33 spaced from the crotch portion provided with a hole at the middle thereof in alignment with a hole in the crotch portion of the bracket to guide the latch member 27 for movement at right angles to the keeper plate 31, and a coiled compression spring 34 encircles the latch member and bears at one end against the cross-member 33 and at the other end against a cross-pin 35 in the latch member to urge the latter normally toward locking engagement with the keeper plate. Struck-up lugs 36 and 37 on the edge of the keeper plate 31 at the opposite ends thereof provide limit stops for engagement by the bracket 32 to prevent over travel of the seat in either direction and accordingly facilitate the adjustment of the seat.

The cranks 18 and 20 have the same throw as the cranks 19 and 21, as clearly appears in Fig. 1, but the upper pivot pin ends 24 of the front cranks 18 and 21 reach to a higher elevation than the corresponding pivot pin ends 24 of the rear cranks 19 and 21, in order to support the seat in inclined relation to the floor, as shown in Fig. 3. The front cranks 18 and 20 are furthermore inclined rearwardly similarly to the rear cranks 19 and 21 so that the pivot pin ends 23 and 24 of the front cranks are parallel to the pivot pin ends of the rear cranks, the upper pivot pin ends 24 of all of the cranks being in right angle relationship to the seat bottom, as shown. The bearings 25 and 26 for the pivot pin ends 23 and 24 are all of pressed sheet metal construction, the same being generally thimble-shaped and having annular flanges 38 forming rims thereon for abutment with the straps 28 and 29 to locate and support the same against endwise movement when the bearings are inserted in the flanged bearing holes 39 provided therefor in the straps, these being formed suitably by piercing and swedging thereof. The end walls 40 of the bearings 25 and 26 have rounded bosses 41 struck from the centers thereof for engagement with the ends of the pivot pins 23 and 24 so that the pins will turn with minimum friction in the bearings and there is also space left at the ends of the pins for storage of lubricant in the assembling of the structure sufficient ordinarily to last the life of the unit. The pivot pin ends 23 and 24 of each crank member are grooved on one side, as indicated at 42 in Fig. 5, and small bosses 43 are struck inwardly from the side walls of the bearing thimbles 25 and 26 to project into these grooves, whereby to keep the bearing thimbles in permanently assembled relation to the pivot pins and accordingly facilitate shipment of these devices to the automobile manufacturers, as well as facilitate assembling of the devices in the cars on the assembly line. The grooves 42 are wide enough and deep enough in relation to the size of the bosses 43, as indicated in Fig. 7, to allow the pins 23 and 24 to turn through at least the small angularity necessary for the adjustment of the seat from one extreme position to the other. There are holes 44 in the bottom of the seat and holes 45 in the floor to accommodate the bearing thimbles described, as well as the flanges of the bearing holes therefor in the straps 28 and 29. The holes 44 are at right angles to the seat bottom, but the holes 45 are inclined from a vertical and the straps 29 are accordingly provided with inclined seats 46 for the bearing thimbles 25 in planes at right angles to the axes of these holes 45. With the construction disclosed, it should be obvious that the seat bottom 17 is movable in a plane inclined at an acute angle to the horizontal and is at right angles to the center line of the car in all positions of adjustment. In passing, attention is called to the coiled tension spring, indicated at 47 in Figs. 1 and 2, connected at the front end to a bracket 48 on the floor and at its rear end to a bracket 49 fastened to the bottom of the seat at the rear thereof, this spring being preloaded sufficiently to substantially counterbalance the seat so that when the latch 27 is released the seat will not gravitate rearwardly but it will require a perceptible force to move it in either direction. In that way, there is no uncertainty attached to the operation of the seat, and the operator soon becomes accustomed to the manipulation of the seat and senses the fact that the spring 47 aids in the forward movement and resists the rearward movement.

Instead of using round rod for the cranks 18—21, I may, of course, use rods of other shaped section and may, for example, use rod material the same as that shown in Figs. 1 to 7 and coin the same between the pivot pin ends to give it a ribbed shape for added strength and rigidity, without necessitating the use of proportionately larger section material. On the other hand, I may utilize cranks formed from sheet metal to channel-shaped cross-section like the crank 18a, for example, shown in Figs. 8 and 9. The crank 18a is formed from a piece of sheet metal of channel-shaped cross-section having the parallel flanges 50 thereof projecting downwardly so as to give the desired strength and rigidity in a vertical plane. The web portion 51 is furthermore ribbed longitudinally, as at 52, for added strength and rigidity. The web portion 51 at the upper end of the crank has a rivet 53 for pivotally connecting the crank to a plate 54 arranged to be secured to the bottom of the seat. A struck-up transverse rib 55 formed on the web portion 52 in inwardly spaced relation to the pivotal connection 53 is adapted to ride against the bottom of the plate 54 so as to relieve the pivotal connection of undue strain. At the lower end of the crank there is another plate 56 pivotally connected to the crank by means of a rivet 57 and adapted to be secured to the floor. The wall 58 on the crank in which the rivet 57 is pivoted may be a separate plate spot-welded to the edges of the flanges 50, although, as illustrated, this wall 58 is an integral extension of the web 51, the web being bent at 59 and 60 to box in the end of the crank and being spot-welded to the edges of the flanges 50. Here again, a transverse rib 61 formed on the wall 58 for sliding engagement with the plate 56 relieves the pivot 57 of undue strain. A distinct advantage in this type of construction is that it eliminates the necessity for providing holes in the floor and in the bottom of the seat, the plates 54 and 56 being arranged to be fastened to these surfaces by screws or bolts, not shown.

Referring to Figs. 10 and 11, the seat 15b is illustrated as equipped with four crank members 18b—21b all having their lower pivot pin ends 23 mounted in suitable bearings in or on the floor 22, the bearings for the front crank members 18b and 20b being substantially at right angles to the horizontal plane of the floor, or nearly so, whereas the bearings for the rear crank members 19b and 21b are inclined rearwardly at an acute angle with respect to the front bearings so as to incline the rear crank members accordingly. This arrangement of the rear crank members in non-parallel relation to the front crank members is for the purpose of providing for the raising of the rear of the seat as the seat is adjusted forwardly, the front portion of the seat remaining substantially at the same elevation throughout its range of adjustment. Such operation, it has been quite generally agreed, is desirable in an adjustable seat, and numerous specially designed seat slide structures have been proposed for accomplishing this result. It is apparent from inspection of Figs. 10 and 11 that with the present crank type seat-supporting means, this kind of operation can be provided for very easily. However, instead of the ordinary journal type bearings 26 illustrated in Figs. 1 to 7, the construction of Figs. 10 and 11 requires ball and socket type connections between the upper ends of the crank members and the bottom of the seat, as indicated at 62, the ball heads being preferably provided on the upper ends of the crank members and the sockets therefor in or on plates arranged to be attached to the seat bottom.

It is believed the foregoing description conveys a good understanding of the objects and advantages of my invention. The appended claims have been drawn with a view to covering all legitimate modifications and adaptations.

I claim:

1. An adjustable seat adapted for use in automobiles and the like comprising in combination with a seat adapted to extend an appreciable portion of the width of the interior of the vehicle, crank means in spaced relation to one another and all extending lengthwise relative to the seat in the same direction from their pivots on the bottom of the vehicle and providing upright pivotal supports for the seat, on which the seat is adapted to have parallel movement fore and aft in an arc with the pivot of each of said crank means as a center, and means for releasably locking the seat in a selected adjusted position.

2. An adjustable seat adapted for use in automobiles and the like comprising in combination with a seat adapted to extend an appreciable portion of the width of the interior of the vehicle, cranks disposed in parallel relation to one another under the four corners of the seat, all pivoted at one end to the bottom of the vehicle and extending lengthwise relative to the seat in the same direction from their pivots on the bottom of the vehicle and pivoted at the other end to the seat on upright pivots, whereby the seat is adjustably supported for parallel movement fore and aft in an arc with the floor pivot of each of said cranks as a center, and means for releasably locking the seat in a selected adjusted position.

3. An adjustable seat adapted for use in automobiles and the like comprising in combination with a seat adapted to extend an appreciable portion of the width of the interior of the vehicle, upright crank members in spaced relation under the seat, straps interconnecting the lower ends of said cranks and the upper ends of said cranks respectively for pivotal movement and so that the cranks of each connected pair are disposed always in parallelism, said straps being adapted to be secured in substantially parallel relation to one another to the floor and seat respectively, the cranks all extending lengthwise relative to the seat in the same direction from their lower pivots, the seat being adapted to have parallel movement fore and aft in an arc with the lower end of each of said cranks as a center, and means for releasably locking the seat in a selected adjusted position.

4. An adjustable seat adapted for use in automobiles and the like comprising in combination with a seat adapted to extend an appreciable portion of the width of the interior of the vehicle, upright cranks disposed under the four corners of the seat, a lower strap interconnecting the lower ends of the cranks at each end of the seat for pivotal movement and adapted to be secured to the floor, an upper strap interconnecting the upper ends of the cranks at each end of the seat for pivotal movement and adapted to be secured to the seat so that the cranks of each connected pair are always disposed in parallelism, the lower straps being secured to the floor in approximate parallelism and the upper straps being secured to the seat in approximate parallelism, the cranks all extending lengthwise relative to the seat in the same direction from their lower pivots, the seat being adjustable on said cranks for movement fore and aft in an arc with the lower end of each of said cranks as a center, and means for releasably locking the seat in a selected adjusted position.

5. A structure as set forth in claim 3, wherein the last mentioned means comprises a latch member mounted on and movable with the seat and engageable selectively with any one of a plurality of spaced openings provided therefor in a keeper plate fixed with relation to the strap connecting the lower ends of said cranks.

6. A structure as set forth in claim 4, wherein the last mentioned means comprises a latch member mounted on and movable with one end of the seat and engageable selectively with any one of a plurality of spaced openings provided therefor in a keeper plate fixed with relation to the strap connecting the lower ends of said cranks at the end of the seat.

7. A structure as set forth in claim 4, wherein the cranks are rearwardly inclined from a vertical and the front cranks support the front portion of the seat at a higher elevation with respect to the floor than the rear cranks support the rear portion, and wherein the last mentioned means comprises a latch member mounted on and movable with one end of the seat relative to a keeper plate inclined with respect to the floor, substantially in parallelism with the bottom of the seat and fixed in relation to the strap connecting the lower ends of the cranks at that end of the seat.

8. An adjustable seat adapted for use in automobiles and the like comprising in combination with a seat adapted to extend an appreciable portion of the width of the interior of the vehicle, upright crank members in spaced relation under the seat, straps for interconnecting the lower ends of said cranks and the upper ends of said cranks respectively, said straps being adapted to be secured to the floor and seat respectively, thimble-like bearings inserted in holes provided therefor in said straps and having the ends of the cranks pivotally engaged therein, so that the cranks operate in parallelism and the seat is adapted to have parallel movement fore and aft in an arc with the floor pivot of each crank as a center, and means for releasably locking the seat in adjusted position.

9. A structure as set forth in claim 8, wherein each of the thimblelike bearings has a central rounded projection on the end wall thereof for engagement with the adjacent end of the pivot portion of the crank for an anti-friction end-thrust bearing.

10. A structure as set forth in claim 8, wherein each of the thimblelike bearings has a radial projection on the side wall thereof projecting inwardly into a transverse groove provided therefor in the side of the pivot portion of the crank, whereby to keep the bearings in assembled relation to the cranks, said projections and grooves permitting limited angular movement of the cranks with respect to the bearings.

11. An adjustable seat adapted for use in automobiles and the like comprising in combination with a seat adapted to extend an appreciable portion of the width of the interior of the vehicle, upright cranks disposed under the four corners of the seat, all of said cranks being inclined rearwardly from a vertical and disposed in parallelism to one another, the cranks under the front portion of the seat having the same throw as the cranks under the rear portion, but being elongated in relation to the rear cranks to support the front portion of the seat at a higher elevation than the rear portion, the seat being thereby adapted to have parallel movement fore and aft about the lower pivot of each of said cranks as a center in a plane inclined at an acute angle to the horizontal, and means for releasably locking the seat in a selected adjusted position.

12. An adjustable seat adapted for use in automobiles and the like comprising in combination with a seat adapted to extend an appreciable portion of the width of the interior of the vehicle, upwardly reaching cranks on the bottom of the vehicle disposed under the four corners of the seat, the cranks under the rear portion of the seat being inclined rearwardly away from the cranks under the front portion of the seat, all of said cranks having pivotal bearings for supporting the lower ends thereof with respect to the bottom of the vehicle, and all of said cranks having substantially the same throw, universal joint connections for the upper ends of said cranks with the seat, said cranks all extending lengthwise relative to the seat in the same direction from their lower pivots, the seat being adapted to have movement substantially parallel to itself fore and aft in an arc with the lower end of each of said cranks as a center, the rear portion of the seat being raised in relation to the front portion in the forward adjustment of the seat by the action of the rear cranks, and means for releasably locking the seat in a selected adjusted position.

13. An adjustable seat adapted for use in automobiles and the like comprising in combination with a seat adapted to extend an appreciable portion of the width of the interior of the vehicle, upright crank members in spaced relation under the seat, plates pivotally connected to the lower ends of said cranks and adapted to be secured to the floor, other plates pivotally attached to the upper ends of said cranks and adapted to be secured to the seat, the cranks all extending lengthwise relative to the seat in the same direction from their lower pivots and being disposed in parallel relation to one another and adapted to permit parallel movement of the seat fore and aft in an arc about the lower pivot of each of said cranks as a center, and means for releasably locking the seat in a selected adjusted position.

14. A structure as set forth in claim 13, wherein each of the cranks comprises a member of channel-shaped cross-section having the flanges thereof in vertical planes whereby to lend rigidity and strength, the pivot at one end of the crank extending through the web portion of the channel, and said crank having a wall interconnecting the edges of the flanges at the other end thereof and carrying the other pivot.

15. A structure as set forth in claim 13, wherein each of the cranks comprises a member of channel-shaped cross-section having the flanges thereof in vertical planes whereby to lend rigidity and strength, the pivot at one end of the crank extending through the web portion of the channel, and said crank having a wall interconnecting the edges of the flanges at the other end thereof and carrying the other pivot, the crank member also having a longitudinal rib formed in the web portion thereof to lend further strength and rigidity.

16. A structure as set forth in claim 13, wherein each of the cranks comprises a member of channel-shaped cross-section having the flanges thereof in vertical planes whereby to lend rigidity and strength, the pivot at one end of the crank extending through the web portion of the channel, and said crank having the web portion extended from the other end of said channel and bent inwardly and joined to the edge portions of the flanges at that end of the crank so as to provide a wall substantially parallel to the web and carrying the pivot for that end of the crank.

17. A structure as set forth in claim 13, wherein each of the cranks comprises a member of channel-shaped cross-section having the flanges thereof in vertical planes whereby to lend rigidity and strength, the pivot at one end of the crank extending through the web portion of the channel, and said crank having a wall interconnecting the edges of the flanges at the other end thereof and carrying the other pivot, the web at the first mentioned end of the crank having a transverse rib formed therein in spaced relation to the pivot and projecting outwardly for sliding bearing engagement with the adjacent plate.

18. A structure as set forth in claim 13, wherein each of the cranks comprises a member of channel-shaped cross-section having the flanges thereof in vertical planes whereby to lend rigidity and strength, the pivot at one end of the crank extending through the web portion of the channel, and said crank having a wall interconnecting the edges of the flanges at the other end thereof and carrying the other pivot, the wall last named having a transverse rib formed thereon in spaced relation to the pivot and projecting outwardly for sliding engagement with the adjacent plate.

LYLE C. ATWOOD.